United States Patent [19]
Roth

[11] Patent Number: 6,137,426
[45] Date of Patent: *Oct. 24, 2000

[54] KEYPAD AND METHOD FOR ARRANGING KEYS OF THE KEYPAD IN A CLOCKWISE ORIENTATION

[75] Inventor: Robert T. Roth, 20812 Townsend Rd., Rohrersville, Md. 21779

[73] Assignee: Robert T. Roth, Elkin, N.C.

[*] Notice: Under 35 U.S.C. 154(b), the term of this patent shall be extended for 625 days.

[21] Appl. No.: 08/511,268

[22] Filed: Aug. 4, 1995

[51] Int. Cl.[7] .................................................. H04B 1/40
[52] U.S. Cl. ........................... 341/20; 379/376; D14/150
[58] Field of Search ................................. 341/20, 21, 22, 341/23, 34; D14/138, 150, 247; 379/376, 377, 378, 357, 440, 433, 429, 52

[56] References Cited

U.S. PATENT DOCUMENTS

| | | | |
|---|---|---|---|
| D. 142,843 | 11/1945 | Deakin | D14/150 |
| D. 145,780 | 10/1946 | Deakin | D14/150 |
| D. 249,449 | 9/1978 | Pink et al. | D7/351 |
| 4,266,118 | 5/1981 | Takase et al. | 219/492 |
| 4,522,518 | 6/1985 | Schmidt | 400/486 |
| 4,745,397 | 5/1988 | Lagerbauer et al. | 341/23 |
| 5,367,298 | 11/1994 | Axthelm | 341/21 |
| 5,479,163 | 12/1995 | Samulewicz | 341/21 |

*Primary Examiner*—Michael Horabik
*Assistant Examiner*—Albert K. Wong

[57] ABSTRACT

A keypad and method for arranging keys on a keypad is accomplished by a keypad typically including numeric keys imprinted with or adjacent uniquely assigned numerals ranging from zero through nine. The keys are arranged in a continuous, typically ascending, sequence residing in two parallel rows arranged horizontally, vertically or diagonally in a clockwise orientation (i.e. traversal of all the keys of both rows in sequential order is in a clockwise direction).

21 Claims, 3 Drawing Sheets

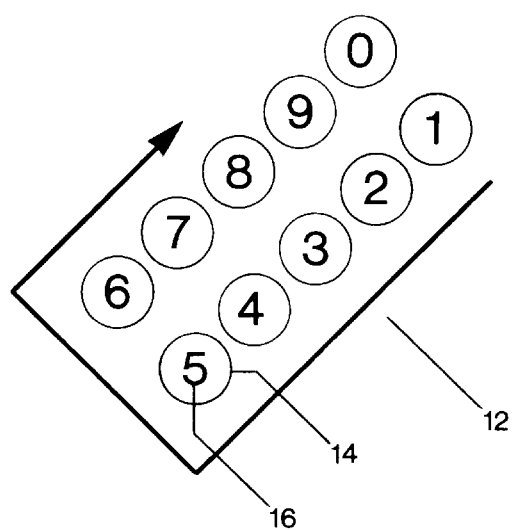
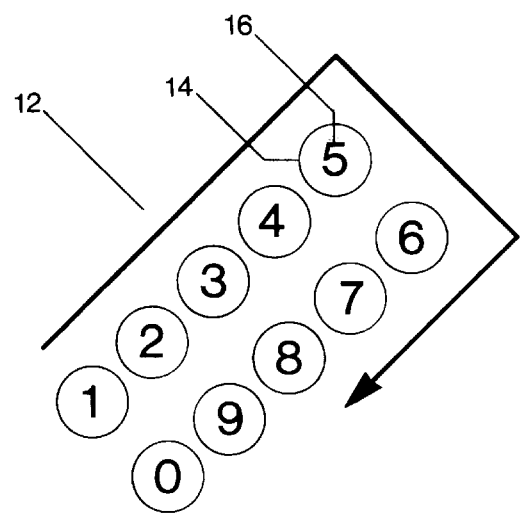
FIG. 6    FIG. 7
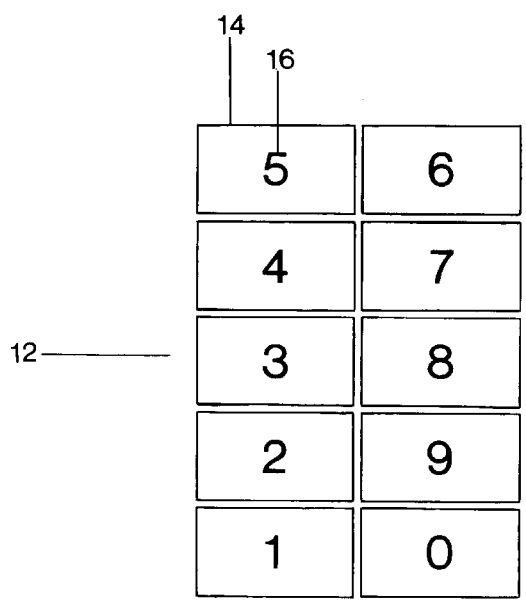
FIG. 8

KEYPAD AND METHOD FOR ARRANGING KEYS OF THE KEYPAD IN A CLOCKWISE ORIENTATION

BACKGROUND OF THE INVENTION

1. Technical Field

The present invention relates to keypads and methods of arranging keys on keypads in a clockwise orientation.

2. Discussion of Prior Art

Ten-digit keypads typically have universal applications and can be found on many items in common use including telephones, calculators, computers, microwave ovens, etc. Prior art keypads vary in terms of order, size, and aesthetics. For example, Deakin (U.S. Pat. No. Des. 145,780) discloses an ornamental design for a telephone desk stand. Specifically, the desk stand includes a center rectilinear panel displaying twenty-five letters of the alphabet and the abbreviation "OPER". Surrounding the center rectilinear panel on opposite sides are two parallel vertical rows each containing five numeral keyswitches (i.e., keys) recessed at a slight angle within the main body of the desk stand and imprinted with unique numerals ranging from zero through nine where the numeral keys in the rows are arranged in a continuous ascending order in relation to the numerals with a counterclockwise orientation (i.e. traversal of all the numeral keys of both rows in ascending order is in a counterclockwise direction). Specifically, a first vertical row contains recessed numeral keys bearing the numerals six through nine followed by zero in a downward sequence of ascending numerals. Corresponding letters on the center rectilinear panel "M" through "Y" (omitting the letter "Q") are arranged in alphabetic order adjacent the inboard sides of numeral keys six through nine in groups of three letters each, the letters in each group being arranged in a vertically downward alphabetic sequence. The inboard side of numeral key zero is adjacent both the letter "Z" and the abbreviation "OPER". A second vertical row contains recessed numeral keys extending downward with the numerals five through one in descending order. Corresponding letters on the center rectilinear panel "A" through "L" are arranged in reverse alphabetic order adjacent the inboard sides of numerals two through five in groups of three letters. The letters in each of these groups are arranged in a vertically upward alphabetic sequence. The net effect of this arrangement is to provide the numerals and letters in a counterclockwise ascending order.

Pink et al (U.S. Pat. No. Des. 249,449) disclose a keypad including ten numeral keys imprinted with unique numerals ranging from zero through nine on a plastic control panel used to operate a microwave oven. The ten numeral keys are arranged in two adjacent parallel horizontal rows each containing five keys where the top row includes numerals one through five from left to right, and the bottom row includes numerals six through nine and zero from left to right. There is no apparent clockwise or counterclockwise orientation of numerals in the two rows.

Lagerbauer et al (U.S. Pat. No. 4,745,397) disclose a remote control device for joint control of radio receivers, record players, tape recorders, television receivers, and other similar devices. The remote control device has two parallel horizontal rows of five numeral keys each, the keys being imprinted with unique numerals ranging from zero through nine. A first row includes numeral keys one through five extending from left to right, and a second row includes numerals six through nine and zero extending from left to right. Ascending order of the numeral keys has no apparent clockwise or counterclockwise orientation as between rows, (i.e. succeeding numerals residing within separate successive rows are not adjacent each other).

Takase et al (U.S. Pat. No. 4,266,118) disclose a microwave oven keypad with numeral keys imprinted with unique numerals ranging from zero through nine arranged in a typical square pattern of three rows and three columns with the numerals arranged in a continuous ascending order. The bottom row includes numerals one through three from left to right, the middle row includes numerals four through six from left to right, and the top row includes numerals seven through nine from left to right. The zero key is located beneath the bottom row in the middle column. The typical square pattern arrangement for the common touch-tone telephone is somewhat similar except that the top and bottom rows are interchanged.

The prior art suffers from several disadvantages. The standard touch-tone pattern telephone keypad is an awkward sequential arrangement of the numeral keys and can lead to reduced efficiency in the entry of data. Further, the standard touch-tone square pattern telephone keypad can be particularly confusing and burdensome for large numbers of dyslexic people.

Keypads including the arrangement of numeral keys in two parallel horizontal rows, each reading left to right, are also confusing because numerically successive keys residing within different rows are not adjacent each other.

Keypads including numeral key arrangements having two parallel rows in a numerically continuous ascending order, with a counterclockwise orientation are less universal, more confusing, and counter-intuitive to the well known clockwise dialing movement and direction of rotary dial telephones. Further, counterclockwise arrangements of numeral keys associated with groups of alphabet letters used in conventional telephones typically tend to arrange the groups of letters in reverse alphabetic order, thereby further increasing the confusion and complexity of keypad operation.

OBJECTS AND SUMMARY OF THE INVENTION

Accordingly, it is an object of the present invention to improve ease and quickness of operation of ten-digit numerical keypads for various modern uses.

It is an another object of the present invention to reduce confusion in operating a keypad by providing a ten-digit keypad having two parallel rows of sequentially numbered keys wherein each row typically includes five numbered keys corresponding to the five fingers of the human hand.

Yet another object of the present invention is to provide a ten-digit keypad including numbered keys arranged in two parallel rows having a continuous thematic, typically ascending, sequence with a clockwise orientation (i.e. traversal of all the keys of both rows in sequential order is in a clockwise direction). The parallel rows may be arranged vertically, horizontally, or diagonally with respect to the keypad.

Still another object of the present invention is to provide a keypad including typically numbered keys arranged in two parallel rows having a continuous thematic, typically ascending, sequence with a clockwise orientation having groups of letters of the alphabet associated with the numbered keys two through nine of a telephone keypad in alphabetic order, the letters being provided adjacent or imprinted on their associated key.

According to the present invention, a ten-digit keypad typically includes two parallel rows of numbered keys, each imprinted with or adjacent a unique numeral ranging from zero through nine, wherein each row has five keys. The keys are arranged in a continuous thematic, typically ascending, order in relation to their numerals with a clockwise orientation (i.e. traversal of all the keys of both rows in sequential order is in a clockwise direction). Further, the parallel rows of keys may be arranged vertically, horizontally and diagonally with respect to the keypad. Importantly, the keys are arranged in a closed clockwise sequential loop wherein every numbered key is positioned such that the next adjacent key in the clockwise sequence is the next numbered key in the number sequence (assuming that the zero key serves as both zero and ten).

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 6 is a frontal view of a keypad with parallel diagonal rows demonstrating the clockwise arrangement according to the present invention.

FIG. 7 is a frontal view of the keypad arrangement of FIG. 6 with an alternative assignment of numerals to the numeric keys according to the present invention.

FIG. 8 is a frontal view of a cash register type of keypad with rectilinear keys arranged in parallel vertical rows according to the present invention.

DESCRIPTION OF THE PREFERRED EMBODIMENTS

FIGS. 6–7 illustrate the concept of the keypads of the present invention. Referring to FIG. 7, keypad 12 includes numbered keys 14 imprinted with respective unique numerals 16 ranging from zero through nine, the keys being arranged in two parallel diagonal rows wherein each row has five keys 14. The rows may be separated by any distance capable of efficient operation of the keypad. The rows together maintain numbered keys 14 in a continuous clockwise ascending order of their numerals 16 (i.e., as shown by the arrow in FIG. 7). Stated otherwise, the present invention arranges keys 14 in an endless numerically sequential clockwise path such that, beginning with any key, traversal of all keys in numerically sequential order based on imprinted numerals 16 requires that keys 14 be traversed in a clockwise direction. This of course assumes that the zero key be considered as both zero and ten.

FIG. 6 illustrates an alternative embodiment and is similar to the keypad of FIG. 7 except that the assignment of numerals one and six have been interchanged to shift the continuous ascending, sequence while still maintaining the clockwise orientation (as shown by the arrow). The upper left row in FIG. 6 includes keys 14 having the sequential numerals six through nine and zero, from left to right, while the bottom right row has keys 14 sequentially numbered one through five from right to left. Any shift in the sequence may be used as long as the clockwise numerical sequence orientation is maintained.

Figure 2:
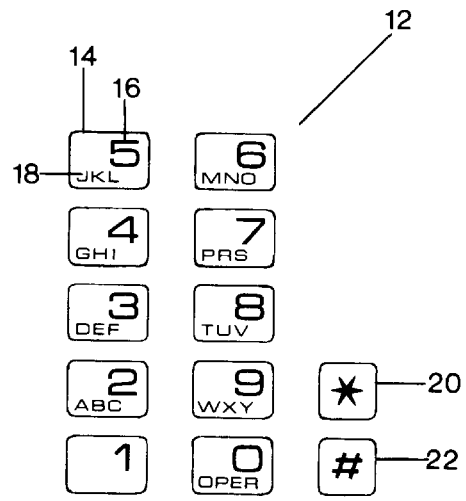
FIG. 2 is a frontal view of a telephone keypad with parallel vertical rows according to the present invention.
Figure 5:
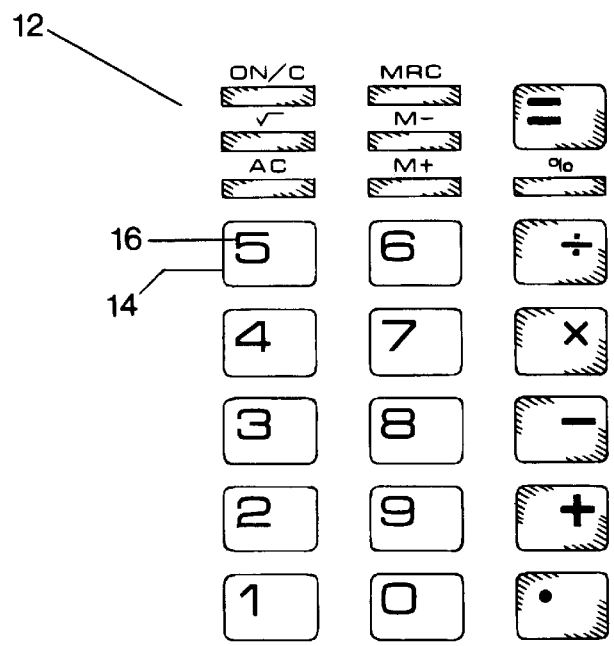
FIG. 5 is a frontal view of a calculator type of keypad with parallel vertical rows according to the present invention.

Referring to FIGS. 2, 5 and 8, the typically ascending clockwise sequences of numbered keys 14 are derived by assigning each of the Arabic numerals (i.e. zero through nine) to one of the fingers on a human hand thereby directly relating the numeral assignments of keys 14 to fingers of the hand. The numeral one is assigned to the small finger (i.e. pinky) of the left hand with the numerals two through five respectively assigned to each of the successively adjacent fingers of the left hand. The numerals six through nine and zero are respectively assigned to successively adjacent fingers of the right hand starting with the right hand thumb. If the hands are placed together defining a vertical plane between them and such that like fingers of each hand touch or coincide and point forwardly with the thumbs occupying the top position, the positions of the fingers having the described assigned numerals specify a keypad having numbered keys arranged in two vertical rows corresponding to the fingers. Specifically, FIG. 2 illustrates a keypad 12, typically for use with telephones, including two parallel rows of numbered keys 14 arranged vertically. Each row includes five keys 14, each being imprinted with a numeral 16 assigned to a corresponding finger. Keys 14 numbered two through nine are also imprinted with corresponding letters 18 of the alphabet as typically found on conventional telephone keypads. The special function keys 20, 22 ("star" and "pound") reside in a parallel vertical third row, but may be in any location adjacent the numbered keys. The rows may be separated by any distance permitting efficient operation of the keypad. Other applications of the vertically arranged keypads include calculator keypads (FIG. 5) and rectilinear keypads for cash registers (FIG. 8).

Figure 1:
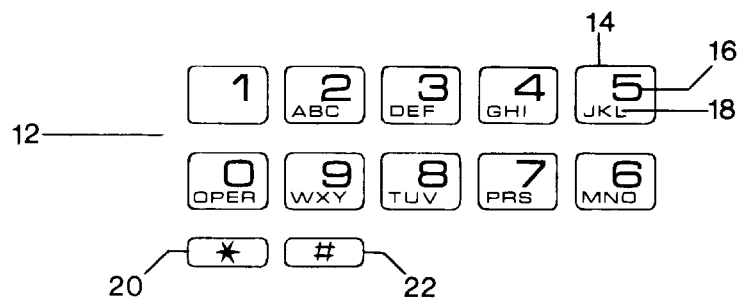
FIG. 1 is a frontal view of a telephone keypad with parallel horizontal rows according to the present invention.

Additional keypad embodiments of the present invention may be specified by simply rotating the hands, placed together in the manner as described above such that the plane between the hands rotates about a horizontal axis. A keypad including horizontally arranged numeric keys may be formed by rotating both hands until the back of the right hand is parallel to the ground whereby the position and numerals assigned to the fingers specify the formation of the keypad. Specifically, FIG. 1 illustrates such a keypad 12, typically for use with telephones, similar to the keypad of FIG. 2 except that keypad 12 utilizes two parallel horizontal rows of keys 14 corresponding to the positions and numeral assignments of the fingers.

Figure 3:
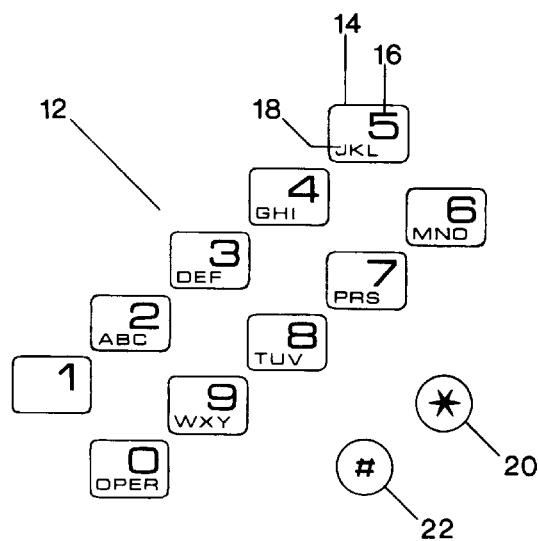
FIG. 3 is a frontal view of a telephone keypad with parallel diagonal rows according to the present invention.
Figure 4:
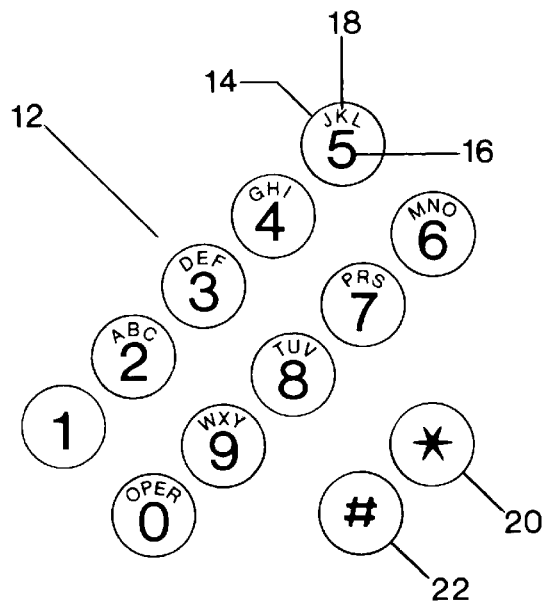
FIG. 4 is a frontal view of a telephone keypad using circular keys with parallel diagonal rows according to the present invention.

A keypad including diagonally arranged numbered keys may be formed by placing the hands together as described above and rotating the plane between the hands to a position intermediate vertical and horizontal. Any point traversed during rotation of the hands between the aforementioned vertical and horizontal positions may suffice whereby the position and assigned numerals of the fingers specify the positions of the numbered keys and formation of the keypad as described above. Specifically, FIGS. 3–4 illustrate such keypads 12, typically for use with telephones, similar to the keypads of FIGS. 1 and 2 described above except that the parallel rows of key are arranged diagonally, and the special function keys 20, 22 reside in a parallel third diagonal row. FIG. 4 illustrates a telephone keypad similar to that of FIG. 3 except that circular numbered keys 14 are utilized instead of rectangular keys.

In addition, another key pad embodiment of diagonally arranged numbered keys may be formed by any diagonal position of keypad 12 arrived at by rotating one's hands as described above from the described vertical position such that the back of the left hand becomes parallel to the ground.

The keypads of the present invention may be implemented by any conventional key functions known in the art or commercially available. Further, the keys of the keypad may be of any shape or size and may be adjacent or contain any imprinted or attached information in any typeface or font by any available or known printing or adhesion methods.

It will be appreciated that the embodiments described above and illustrated in the drawings represent only a few of the many ways of implementing a keypad and method for arranging the keys in a clockwise orientation.

The present invention is not limited to the aforementioned applications but may be applied to any device utilizing a keypad. Further, the parallel rows of numbered keys may be arranged at any angle as long as the clockwise orientation is maintained.

The keypads of the present invention may be implemented for any keypad applications and in connection with combinational logic, specific circuitry, or other means capable of responding to keypad operations (i.e. input of numeric data).

The clockwise orientation of keys according to the present invention may be implemented with any thematic sequence using any type of symbols or information.

From the foregoing description it will be appreciated that the invention makes available a novel keypad and method of arranging the keys of a keypad in a clockwise orientation wherein keys of the keypad are arranged in two parallel rows in a continuous thematic sequence such that traversal of the keys in sequential order is in a clockwise direction. In addition, the parallel rows may have a vertical, horizontal, or diagonal orientation.

Having described preferred embodiments of a new and improved keypad and method of arranging the keys of the keypad in a clockwise orientation, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A keypad for facilitating efficient entry of numeric data, said keypad comprising:

a plurality of actuable keys, at least some of which are numeric keys wherein an associated numeral unique to each numeric key is affixed to or adjacent that key, each numeric key having a predetermined length along a first dimension of said keypad;

said numeric keys being arranged in first and second immediately adjacent straight parallel rows of five keys each in clockwise ascending order of said associated numerals such that none of said actuable keys are disposed between said parallel rows of said numeric keys, and such that said rows extend along a second dimension of said keypad and are arranged in said first and second dimensions in positions facilitating efficient entry of numeric data;

wherein said keypad contains ten of said numeric keys and each said numeric key is uniquely associated with a respective numeral in the range of zero through nine.

2. The keypad of claim 1 wherein said first row contains numeric keys associated with respective affixed or adjacent numerals one through five, said second row contains numeric keys associated with affixed or adjacent numerals six through nine and zero, wherein the numeric keys associated with numerals five and six are adjacent keys in said clockwise ascending order.

3. The keypad of claim 1 wherein each of said numeric keys numbered two through nine is associated with a respective plurality of sequential letters of the alphabet, and wherein successive numeric keys in said clockwise order are associated with respective letter groups that are alphabetically sequential.

4. The keypad of claim 1 wherein said numeric keys are arranged such that said rows extend along said second dimension at right angles relative to said first dimension.

5. The keypad of claim 4 wherein said parallel rows extend vertically along said keypad.

6. The keypad of claim 4 wherein said parallel rows extend horizontally along said keypad.

7. The keypad of claim 1 wherein said parallel rows extend diagonally along said keypad.

8. The keypad of claim 1 wherein said plurality of actuable keys includes a plurality of operation keys wherein a symbol corresponding to a function unique to each operation key is affixed or adjacent that key.

9. A method for facilitating efficient entry of numeric data at a keypad by arranging a plurality of actuable keys, at least some of which are ten numeric keys wherein an associated numeral unique to each said numeric key is affixed to or adjacent that key, each of said ten numeric keys having a predetermined length along a first dimension of said keypad, said method comprising the step of:

(a) arranging said ten numeric keys in two immediately adjacent straight parallel rows of five keys each wherein said associated numerals of said ten numeric keys are arranged clockwise in a continuous ascending order such that none of said actuable keys are disposed between said two parallel rows of said numeric keys, and such that said rows extend along a second dimension of said keypad and are arranged in said first and second dimensions in positions facilitating efficient entry of numeric data.

10. The method of claim 9 wherein each said numeric key is uniquely associated with a numeral in a range of zero through nine, and wherein step (a) includes arranging said ten numeric keys in an endless clockwise and numerically ascending sequence.

11. The method of claim 9 wherein step (a) comprises arranging said ten numeric keys such that said rows extend along said second dimension at right angles relative to said first dimension.

12. The method of claim 11 wherein step (a) further includes arranging said ten numeric keys in two parallel vertically extending rows along said keypad.

13. The method of claim 11 wherein step (a) further includes arranging said ten numeric keys in two parallel horizontally extending rows along said keypad.

14. The method of claim 9 wherein step (a) comprises arranging said ten numeric keys in two parallel diagonally extending rows along said keypad.

15. The method of claim 9 wherein step (a) includes affixing to each said numeric key said associated numeral.

16. The method of claim 9 wherein step (a) includes placing each said numeric key adjacent said associated numeral.

17. The method of claim 9 further comprising the step of:

(b) further uniquely associating a respective group of successive alphabet characters with each of said numeric keys numbered two through nine such that successive keys in said clockwise order are associated with respective character groups that are alphabetically sequential.

18. A telephone keypad for facilitating efficient entry of numeric data into a telephone system to initiate an occurrence of a particular event, said telephone keypad comprising:

a plurality of actuable keys, at least some of which are numeric keys wherein an associated numeral unique to each numeric key is affixed to or adjacent that key, each numeric key having a predetermined length along a first dimension of said keypad;

said numeric keys being arranged in two immediately adjacent straight parallel rows of five keys each wherein said associated numerals of said numeric keys are arranged clockwise in a continuous ascending order such that none of said actuable keys are disposed between said parallel rows of said numeric keys, and such that said rows extend along a second dimension of said keypad and are arranged in said first and second dimensions in positions facilitating efficient entry of numeric data into said telephone system;

wherein said telephone keypad contains ten numeric keys and each said numeric key is uniquely associated with a respective numeral in the range of zero through nine.

19. A method for facilitating efficient entry of numeric data at a telephone keypad into a telephone system to initiate an occurrence of a particular event by arranging a plurality of actuable keys, at least some of which are ten numeric keys wherein an associated numeral unique to each said numeric key is affixed to or adjacent that key, each of said ten numeric keys having a predetermined length along a first dimension of said keypad, said method comprising the step of:

(a) arranging said ten numeric keys on said telephone keypad in two immediately adjacent straight parallel rows of five keys each wherein said associated numerals of said ten numeric keys are arranged clockwise in a continuous ascending order such that none of said actuable keys are disposed between said two parallel rows of said numeric keys, and such that said rows extend along a second dimension of said telephone keypad and are arranged in said first and second dimensions in positions facilitating efficient entry of numeric data into said telephone system.

20. A method for facilitating efficient entry by an operator of numeric data having plural numerals into a telephone system for initiating an occurrence of a particular event via a ten-digit telephone keypad having a plurality of actuable keys including numeric keys, wherein an associated numeral unique to each said numeric key is affixed to or adjacent that key, and said numeric keys are arranged on said telephone keypad in two immediately adjacent straight parallel rows of five keys each, wherein said associated numerals of said numeric keys are arranged clockwise in a continuous ascending order such that none of said actuable keys are disposed between said parallel rows of said numeric keys, said method comprising the steps of:

(a) entering each numeral in said numeric data by locating a corresponding numeric key on said keypad on the basis of its position in said clockwise ascending order arrangement of said associated numerals;

(b) actuating each numeric key located in step (a) by one hand of the operator; and (c) repeating steps (a)–(b) until all numerals of said numeric date have been entered, wherein said numeric keys are actuated only by said one hand.

21. A method for facilitating efficient entry by an operator of numeric data having at least one numeral into a device responsive to numerical input data for initiating an occurrence of a particular event via a ten-digit keypad having a plurality of actuable keys including numeric keys, wherein an associated numeral unique to each said numeric key is affixed to or adjacent that key, and said numeric keys are arranged on said keypad in two immediately adjacent straight parallel rows of five keys each, wherein said associated numerals of said numeric keys are arranged clockwise in a continuous ascending order such that none of said actuable keys are disposed between said parallel rows of said numeric keys, said method comprising the steps of:

(a) entering each numeral in said numeric data by locating a corresponding numeric key on said keypad on the basis of its position in said clockwise ascending order arrangement of said associated numerals;

(b) actuating each numeric key located in step (a) by one hand of the operator; and (c) repeating steps (a)–(b) until all numerals of said numeric data have been entered, wherein said numeric keys are actuated only by said one hand.

* * * * *